Oct. 19, 1937.  M. E. LEEDS  2,096,047

TEMPERATURE MEASURING SYSTEM

Filed Oct. 10, 1934  3 Sheets-Sheet 1

INVENTOR.
Morris E. Leeds
BY Cornelius D. Ehret
his ATTORNEY

Oct. 19, 1937. M. E. LEEDS 2,096,047
TEMPERATURE MEASURING SYSTEM
Filed Oct. 10, 1934 3 Sheets-Sheet 2

INVENTOR.
Morris E. Leeds
Cornelius D. Ehret
BY
his ATTORNEY

Oct. 19, 1937.   M. E. LEEDS   2,096,047
TEMPERATURE MEASURING SYSTEM
Filed Oct. 10, 1934   3 Sheets-Sheet 3

INVENTOR.
Morris E. Leeds
BY Cornelius D. Ehret
his ATTORNEY

Patented Oct. 19, 1937

2,096,047

UNITED STATES PATENT OFFICE 2,096,047

TEMPERATURE MEASURING SYSTEM

Morris E. Leeds, Philadelphia, Pa., assignor to Leeds & Northrup Company, Philadelphia, Pa., a corporation of Pennsylvania Application October 10, 1934, Serial No. 747,724

21 Claims. (Cl. 73—32)

My invention relates to temperature measuring systems and more particularly to such systems utilizing thermocouples for measuring or obtaining an indication of an unknown temperature.

Temperature-responsive systems utilizing thermocouples depend, for their operation, upon the fact that an electromotive force is generated by the thermocouple which is a function of the difference in temperatures between the hot and cold junctions of the thermocouple. However, in most cases, it is desired to obtain an indication of the temperature existing at a particular point and not of the difference between the temperatures of two distinct points, such as the two junctions of a thermocouple. Accordingly, it is necessary either to maintain one of the junctions at a constant known temperature, or to apply a correction for the variation in temperature of such junction from the temperature at which the thermocouple was calibrated.

In this connection, it is to be noted that the electromotive force generated by a thermocouple is a function not only of the difference in temperature between its two junctions, but also of the actual temperatures of its junctions. For example, the electromotive force generated by a thermocouple for a temperature difference of 100° between its two junctions is quite different when one of its junctions is at zero degrees and the other at 100° from that generated when one of its junctions is at 900° and the other at a 1000°. Thus, an accurate correction for variations in the temperature of the cold junction cannot be made simply by changing the constants of an associated instrument in accordance with the temperature variation of the cold junction from the temperature at which the junction was maintained during calibration of the thermocouple.

It has been proposed heretofore to compensate for the variations of temperature of the cold junction of a thermocouple by extending from the thermocouple to the measuring or indicating apparatus conducting leads of the same material as the elements of the thermocouple and including in the measuring apparatus a resistance having a temperature coefficient such as will produce in the measuring apparatus an effect having a characteristic equal and opposite to that produced by the variation in the temperature of the cold junction of the thermocouple from the calibration temperature. In cases where it is desired to measure extremely high temperatures, however, resort has been had to thermocouples made up of the noble metals, for example, of platinum and platinum-rhodium. In such cases, it is uneconomical and impractical to utilize leads of such noble metals from the thermocouple to the measuring apparatus, which may be remote from the thermocouple. Furthermore, there have been developed lately thermocouples capable of measuring temperatures even higher than those for which the noble metal thermocouples are suitable. These higher temperature thermocouples are generally made up of refractory elements such, for example, as graphite and tungsten, graphite and tantalum, and carbon and silicon carbide. Materials of such refractory thermocouples do not have the proper physical characteristics for fabricating into small gauge lead wires suitable for interconnection of the thermocouple elements and the measuring apparatus which, as stated above, may be quite remote from each other.

This problem has been solved in part by apparatus such as that disclosed in Patent No. 1,199,724 to Felix Wunsch, in which there is provided an auxiliary potentiometer resistance and cooperating scale manually adjustable in accordance with the temperature of the cold junction as independently determined. Such an arrangement is thus not direct reading but requires the reading of a thermometer or the like and further manual setting of a rheostat or slidewire. Also, the special case of a thermocouple assumed to have linear characteristics, that is; an electromotive force dependent only upon the difference in temperatures of the hot and cold junctions and independent of the actual temperatures of these points, is solved by the apparatus of Patent No. 1,227,337 to Thomas Spooner. In the arrangement of that patent there are provided two potentiometer resistances, one adjustable in response to the electromotive force of the main thermocouple and one, adjustable in response to the electromotive force of the auxiliary thermocouple. The potentiometer scale and indicator are both movable, each in accordance with the adjustable contact of one of the potentiometer resistances. However, it is a well-known fact that the majority of thermocouples in commercial use do not have linear characteristics over any considerable range, so that the accuracy and operating range of such apparatus is seriously limited. In addition, neither of the arrangements just discussed have provision for an inversion of the characteristic of the thermocouple, that is, an actual reversal of the thermo-electromotive force over a portion of its operating range.

It is an object of my invention, therefore, to provide a new and improved direct reading temperature-responsive system which will overcome the above mentioned disadvantages of the arrangements of the prior art and which will be universal in its application to thermocouples having any predetermined characteristics.

In accordance with one embodiment of my invention, there is included in a temperature-responsive system a main thermocouple provided with a cold junction and with a hot junction subjected to a temperature from which a response is desired. The thermocouple is adjustably connected to a potentiometer circuit through an indicating device such as a galvanometer. There is also provided a second circuit including an auxiliary thermocouple, or other means, responsive to the temperature of the cold junction of the main thermocouple and also including an indicating device. If desired, a single indicating device may be employed for both circuits by use of a suitable transfer switch. There is provided means for balancing the indicating device in the second circuit and simultaneously adjusting one of the connections of the first circuit to the potentiometer to compensate for the temperature of the cold junction to the thermocouple. The other connection of the first circuit to the potentiometer is then adjusted to balance the indicating device therein, and this last-mentioned adjusting means includes a movable element or member, the position of which is a direct indication or a measure of the temperature at the thermocouple. The connection of the thermocouple circuits to the potentiometer is such that temperatures resulting in a reversal or inversion of the electromotive force thereof may be correctly indicated. In accordance with another feature of my invention, the balancing of the main thermocouple circuit and the compensating circuit is carried out automatically and periodically and, if desired, the transfer of the indicating instrument between the two circuits during the balancing operations may be effected automatically by the same apparatus.

By the term "cold junction", as used above and hereinafter, I refer to that junction which is maintained at a predetermined reference temperature during the calibration of the thermocouple and which may or may not be lower than the temperature to be measured. Similarly, by the term "hot junction" is meant that junction of the thermocouple which is utilized to measure the unknown temperature and which is varied throughout a normal range of temperatures in obtaining the calibration characteristic of the thermocouple.

By the term "high temperature thermocouples" as used above and hereinafter, I refer to thermocouples of the noble metals, to those having at least one element formed of refractory material and to thermocouples which have at least one element which is unsuitable for lead purposes either because too expensive or of material not adapted for construction of lead wires or conductors.

For a better understanding of my invention, together with a description of other features thereof, reference is had to the following description taken in connection with the accompanying drawings, and its scope will be pointed out in the appended claims.

Referring to the drawings.

Fig. 2 is a temperature-voltage characteristic of a typical refractory thermocouple suitable for use in connection with my invention, while

Figure 1:
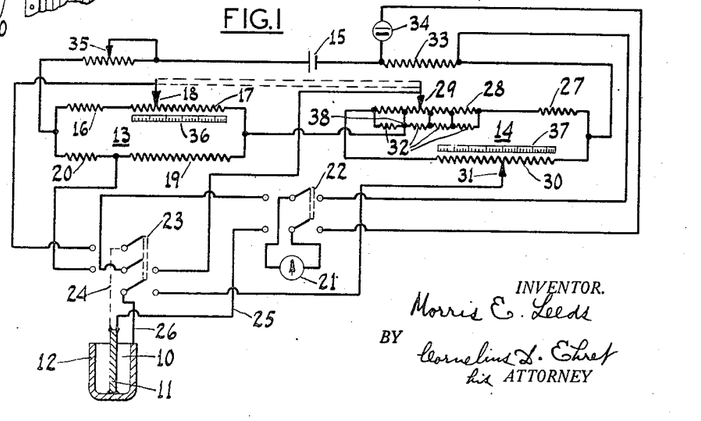
Fig. 1 is a circuit diagram of a temperature-responsive system embodying my invention.

Referring, now, more particularly to Fig. 1, there is shown a circuit diagram of a temperature-responsive system embodying my invention. This system comprises, essentially, a main thermocouple 10, composed of the elements 11 and 12, and a pair of balanceable networks shown as potentiometers 13 and 14 energized from a source of current, such as a battery 15, either in parallel or in series, as illustrated. The thermocouple 10 may be of any of the types well-known in the art, although I prefer to use a refractory thermocouple, such as one of graphite-tungsten, graphite-tantalum, or carbon-silicon carbide, although I have illustrated, by way of example, a thermocouple consisting of a tungsten element 11 and a graphite element 12. The potentiometer 13 is a double-arm potentiometer, one arm of which consists of a fixed resistance element 16 and a resistance provided with an adjustable connection 18. The other arm of the potentiometer 13 comprises a fixed resistance element 19 and a resistance element 20 preferably having a positive temperature coefficient of resistance, a characteristic described more fully hereinafter.

There is also provided at least one indicating device, such as a galvanometer 21, which may be connected selectively in circuit with a standardizing circuit or the potentiometers 13 or 14 by means of the double-throw switches 22 and 23. With the switches 22 and 23 in their left-hand positions, the galvanometer 21 is connected to the potentiometer 13 at the junction of resistors 19 and 20 and the adjustable contact 18 through the conductors 24 and 25 which are joined at the cold junction of the main thermocouple 10. The conductor 24, of any suitable base metal, such as constantan, an alloy consisting of a mixture of approximately 60 per cent copper and 40 per cent nickel, and the copper conductor 25, form an auxiliary thermocouple, the hot junction of which is at the cold junction of the main thermocouple and the cold junction of which is at the switches 22 and 23, which are preferably included in a single apparatus, together with the potentiometers 13 and 14 and the galvanometer 21.

The potentiometer 14 comprises a fixed resistance element 27 and a resistance element 28 which may preferably take the form of a slidewire provided with an adjustable connection 29. The other arm of the potentiometer 14 consists of the single resistance element 30 which is also preferably a slidewire having an adjustable connection 31. When the switch 23 is operated to its right-hand position, the main thermocouple 10 is connected between the adjustable contacts 29 and 31 through the galvanometer 21. It will be noted that the adjustable connections 18 and 29 are mechanically interconnected, as indicated by the dotted lines joining them. As will be pointed out more fully hereinafter, it is necessary that the adjustable connections 18 and 29 shall have different characteristics with respect to their cooperating resistance elements 17 and 28, respectively. This may be secured by winding the slidewire 28 on a tapered form or, as illustrated, by dividing it into sections and connecting across the sections fixed resistance elements 32 of different magnitudes of resistance. It will also be noted that the current connection to the left end of the potentiometer 14 is made at an intermediate point of the slidewire 28 to provide for an inversion of the thermocouple characteristics, as described more fully hereinafter. Included in the connection between the battery 15 and the potentiometers 13 and 14 is a fixed standardizing resistance 33. When the switch 22 is operated to its right-hand position, the galvanometer 21 is connected in series with this standardizing resistance and a standard cell 34 or other suitable reference voltage. A variable resistance device 35, included in circuit with the battery 15, is effective to adjust the current through the potentiometers to compensate for any variations in voltage of the battery 15, an arrangement well-known in the art.

If desired, suitable scales 36 and 37 may be associated with the slidewire resistances 17 and 30. It will be understood that these scales may be either movable with the movable elements of the slidewire resistances, or they may be stationary, in which case a cooperating pointer or indicating device is carried by the movable element of the slidewire resistance.

In the operation of the above-described temperature-responsive system, switch 22 is initially operated to its right-hand position, placing the galvanometer 21 in circuit with the standard cell 34 and standardizing resistance 33, and the resistance 35 is adjusted to secure a balance of the galvanometer 21, and thus a standard current through the potentiometers 13 and 14.

Figure 2:
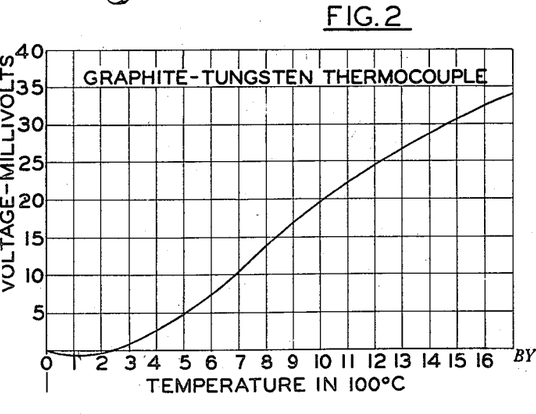

The switch 22 is then operated to its left-hand position. If the switch 23 were now operated to its right-hand position, the elements 11 and 12 of the thermocouple 10 would be connected through the conductors 25 and 26, respectively, and the galvanometer 21, to the adjustable connection 29 of the slidewire resistance 28 and the adjustable connection 31 of the slidewire resistance 30. The polarities of the thermo-junctions are such that the potential difference between the adjustable contact 29 and the adjustable contact 31 is in opposition to the electromotive force produced at the junction of the elements 11 and 12 of the thermocouple. Therefore, if the adjustable contact 29 were at its extreme left-hand position, and if the effective temperature at the cold junction of the thermocouple made up of the elements 11 and 12 were a constant low reference temperature with respect to which the calibration of the thermocouple was taken, for example zero degrees Centigrade, the position of the adjustable contact 31 to secure a balance of the galvanometer 21 would represent the temperature of the hot junction of the elements 11 and 12. If the scale 37, associated with the slidewire resistance 30, were in accordance with the calibration characteristic of the thermocouple 10, the unknown temperature could then be read directly from the scale 37. A typical calibration characteristic of such a thermocouple is illustrated in Fig. 2, which clearly indicates the non-linear characteristic of such a thermocouple. As shown, the thermo-electromotive forces in millivolts are plotted as ordinates against temperatures of the hot junction as abscissae, the cold junction remaining at the reference temperature, which may be zero degrees Centigrade.

As stated above, however, the electromotive force or output voltage of a thermocouple depends not only upon the difference in temperature between its hot and cold junctions, but also the absolute temperature of its junctions.

Moreover, in practice the temperature of the cold junction of the thermocouple made up of the elements 11 and 12 varies within a considerable range and, generally, is above the calibrating reference temperature. Thus, the electromotive force of the thermocouple, except where there is an inversion in its characteristic, is less than it should be, and the galvanometer would balance with the adjustable contact 31 nearer the left-hand portion of its scale than for that position corresponding to the correct temperature on the scale 37. If, now, the adjustable contact 29 is moved so as to introduce between the point 38 and the contact 29 an electromotive force exactly equal to the change in the electromotive force of the thermocouple occasioned by the higher temperature of its cold junction, then the balance point on the slidewire 30 will be moved by an amount represented in electromotive force by the electromotive force between the point 38 and the adjustable contact 29. In other words, the electromotive force between the adjustable connection 31 and the point 38 now corresponds to that electromotive force which would be generated by the thermocouple 10 with its hot junction at the given temperature, and with its cold junction at the reference temperature, and a correct reading of temperature can be obtained on the scale 37.

In order to secure the proper adjustment of the contact 29, the switch 23 is operated to its left-hand position, in which position the element 12 and associated connection 26 is left free, while the auxiliary thermocouple comprising the constantan conductor 24 and the copper conductor 25 are connected, as above described, to the adjustable connection 18 and the junction between resistors 19 and 20, respectively. As stated above, the conductors 24 and 25, fastened at the element 11, comprise an auxiliary base-metal thermocouple, the hot junction of which is subjected to the cold junction temperature of the main thermocouple. This is true because of the fact that in thermocouples of the type described, the outer ends of the elements, such as the elements 11 and 12, are encased in a common housing which may, for example, be suitable for cooling the thermocouple by water or other cooling fluid. Under these conditions, the adjustable connection 18 is moved to secure a balance of the galvanometer 21 and, because of the mechanical interconnection between the adjustable connections 18 and 29, the latter is also moved simultaneously.

However, since the constantan-copper auxiliary thermocouple has a calibration characteristic different from that of the main thermocouple, it is necessary to modify the effect of equal movements of the adjustable connections 18 and 19 on their respective circuits, in accordance with the relative characteristics of these two thermocouples. As stated above, this may be done by winding the slidewire 28 on a non-cylindrical form, of the proper shape, to secure these relative characteristics, or the resistance 28 may be divided into sections across which are connected the resistance elements 32, of proper magnitudes to secure the desired characteristic relative to that of the resistance element 17.

Figure 2A:
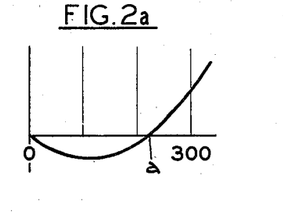
Fig. 2a is a portion of a temperature-voltage characteristic of a thermocouple having an inversion near its origin.

As stated above, certain thermocouples have an inversion in their characteristic; that is, their thermo-electromotive force reverses polarity over a portion of their range of operation, usually at or near the low temperature end thereof. A portion of such a characteristic is shown in Fig. 2a of the drawings. In order to compensate for the effect of the cold junction temperature of such a thermocouple, it is necessary that the voltage or electromotive force, introduced in the measuring circuit by adjustment of connection 29 of the potentiometer 14, be such as to correct for the aforesaid inversion in this portion of the operating range. This can be accomplished by making the current connection to the potentiometer 14 at an intermediate point 38 of the slidewire 28, as shown in Fig. 1. With such an arrangement, the potential gradient characteristic of the slidewire 28 reverses at the point 38 of connection thereto. More specifically, as the adjustable connection 29, from its left-most position, moves toward the point 38 the electromotive force between connections 29 and 31 increases until connection 29 electrically coincides with the point 38.

In terms of Fig. 2a this added electromotive force corrects for the rise in the negative sense, of the thermo-electromotive force, which is shown to reach a maximum for a temperature somewhat above 100° C. Thereafter the thermo-electromotive force decreases, reaching zero somewhat above 200° C.

As the adjustable connection 29 moves to the right of point 38, the electromotive force between connections 29 and 31 decreases to correct for the thermocouple characteristic, which, Figs. 2 and 2a, shows a decreasing thermo-electromotive force between about 100° C. to about 250° C. In this manner, as previously explained, the resistance 28 is effective to introduce into the measuring circuit an electromotive force of correct magnitude to shift the position of contact 31 which produces balance of the potentiometer network 14 so that, at all times, the temperature to which the hot junction of thermocouple 10 is subjected may with accuracy be read on scale 37 notwithstanding the aforesaid reversal of polarity characteristic.

The auxiliary thermocouple comprising the conductors 24 and 25 is preferably additionally corrected for variations in the temperature of its cold junction, since it is calibrated also with its cold junction at a fixed reference temperature. This may be done by means of the resistance element 20, having a temperature coefficient of resistance of such characteristic that it produces an effect in the potentiometer 13 approximately equal and opposite to that produced by variations in the temperature of the cold junction of the auxiliary thermocouple. In the example described, the element 20 has a positive temperature coefficient of resistance which correctly compensates for the aforesaid changes in temperature of the cold junction. As noted above, the cold junction of the auxiliary thermocouple is at the switch 23 and is within the measuring apparatus itself, usually in an enclosing housing, adjacent to which is placed the resistance 20 which is, therefore, at a temperature equal to that of the cold junction of the auxiliary thermocouple. This latter method of correction for variations in the cold junction temperature of a thermocouple is specifically that disclosed and claimed in U. S. Letters Patent #1,209,372, granted December 19, 1916, upon the application of Felix Wunsch.

After adjustment of connections 18 and 29 as described above, the switch 23 is operated to its right hand position to connect the thermocouple 10 and galvanometer 21 in circuit with potentiometer 14. The adjustable connection 31 is then moved to secure a balance of the galvanometer 21 or to a position where there is no deflection of the galvanometer needle or pointer. The temperature to which the hot junction of thermocouple 10 is subjected may then be read directly from the temperature scale 37.

While my invention may be embodied in a manually operated system of the type just described, it is also suitable for application to an automatic indicating and recording apparatus. Such an apparatus is shown in front and rear elevations in Figs. 3 and 4, respectively. Although my invention is susceptible of use in indicating and recording mechanisms generally, I prefer to use the type of mechanism disclosed and claimed in U. S. Letters Patent #1,935,732, granted November 21, 1933, upon the application of Lloyd Y. Squibb, the general features of such an apparatus being shown in the drawings.

Figure 3:
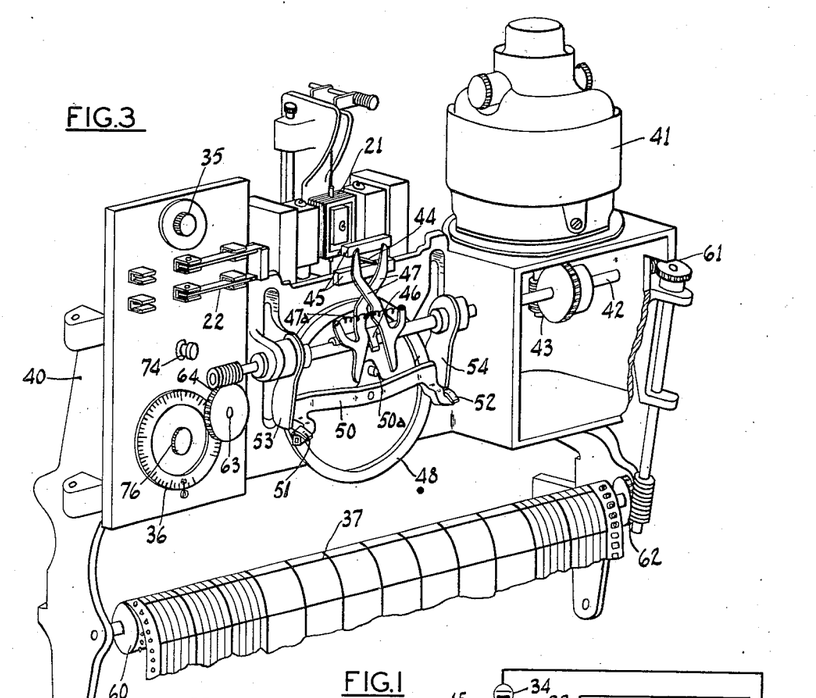
Fig. 3 is a front view, in perspective, of an automatic recording apparatus in which my invention may be utilized.
Figure 4:
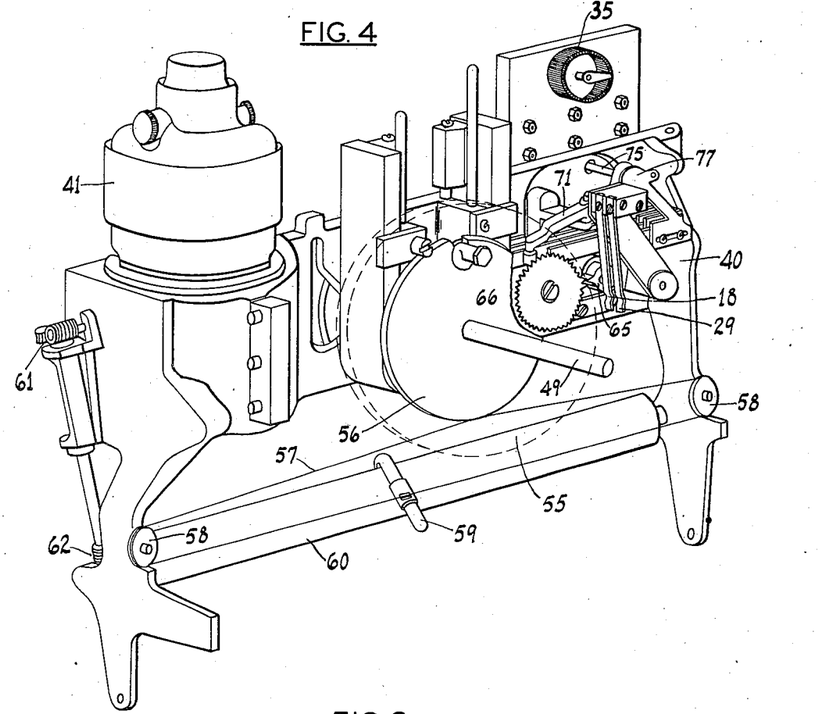
Fig. 4 is a rear view, in perspective, of the apparatus shown in Fig. 1, with certain parts omitted.

Referring more particularly to Figs. 3 and 4, the apparatus comprises a main frame 40 on which is supported a motor 41 connected continually to rotate a shaft 42 through a suitable gearing 43. Also supported from the frame 40 is a suitable indicating instrument or galvanometer 21, corresponding to the instrument referred to by the same number in Fig. 1. The galvanometer 21 is provided with a deflecting needle 44 disposed to move between a pair of parallel clamping bars 45. One of these bars is periodically moved into engagement with the needle 44, and cooperates with the other bar to clamp the needle and arrest its motion. This periodic clamping may be effected by a suitable cam surface of the cam 46 attached to the shaft 42, and suitable linkage mechanism omitted from the drawings for the sake of clarity. Cooperating with the movable needle 44 is a pair of independently pivoted, scissors-like arms or members 47 biased into engagement by a spring 47a but periodically separated by an arm of the cam 46. There is also provided a rotatable disk 48 mounted behind the arms 47 and the rotating shaft 42. Cooperating with the disk 48 is a pivotally mounted, normally horizontal arm 50 provided at its ends with the cam surfaces 51, 52 mounted in the path of rotation of a pair of cams 53 and 54, respectively, attached to the continually rotating shaft 42. The pivotally mounted arm 50 is provided with suitable clutch shoes at its extremities adapted to bear on the rim of the disk 48 but is arranged to be lifted periodically from engagement with the disk 48 by suitable mechanism operated by the cam 46, not shown in the drawings. Projecting upwardly from the arm 50 is a lug or pin 50a adapted to engage the lower arms of the members 47.

It will be apparent that the clamping of the needle 44 between the members 45, the periodic separation of the arms 47, and the periodic raising of the arm 50 from engagement with the disk 48 are properly synchronized by means of appropriate cam surfaces of the cam 46. Mounted on the shaft 49 of the disk 48, projecting rearwardly from the frame 40 (Fig. 4), is a suitable disk 55, shown in dotted lines for the sake of clarity, carrying the slide wire resistance 30 of Fig. 1. A pulley 56 is also mounted on the shaft 49 and carries an endless cord or wire 57 which moves between the idler pulleys 58 supported at the ends of the frame 40 and carries a suitable recording pen or stylus 59 cooperating with the scale chart 37 (Fig. 3), mounted on a drum 60, suitably rotated by the motor 1 through the gearing 43, 61 and 62. It will be noted that the regulating resistance 35 and the switch 22, for connecting the galvanometer 21 in the standardizing circuit, are included on a panel supported from the frame 40.

A detailed explanation of the operation of the above-described apparatus per se may be found in the above-mentioned U. S. Patent #1,935,732. In brief, the members 45 periodically engage or clamp the needle 44 of the galvanometer 21, one member, by suitable cams or links operated by the shaft 42, being movable into and out of a clamping position. During the portion of the cycle of rotation of the shaft 42 in which the members 45 are out of engagement with the galvanometer needle 44, so that it is free to move, the cam 46 effects the separation of the arms 47 against the action of their biasing spring 47a to allow free movement of the needle 44. As soon as the needle 44 is clamped, the cam 46 disengages the arms 47 allowing them to close under the influence of the spring 47a. If the needle 44 is in its balanced or mid-position, the arms 47 close thereon symmetrically and no change in the remaining parts of the apparatus is effected.

However, if, during the preceding interval between successive clampings of the needle 44 by the members 45, there has been a change in temperature at the thermocouple 10 so that the galvanometer 21 is unbalanced and the needle 44 is deflected, as the spring 47a returns the arms 47 into engagement, one of the arms, depending upon the direction of deflection of the needle 44, will engage the needle 44 before the other, and the spring 47a will then rotate the second arm about its pivot, and its lower end will engage the pin 50a projecting upwardly from the arm 50 and will rotate the arm 50 through an angle proportional to the deflection of the needle 44. During this portion of the cycle, the arm 50 is raised out of engagement with the disk 48 so that there is little force resisting its movement. At this point, the arm 50 is released to reengage the disk 48. The cams 53, 54 on the continuously rotating shaft 42 then engage one or the other of the cam surfaces 51, 52 to return the arm 50 to its horizontal position and, at the same time, rotate the disk 48 and with it the disk 55 carrying the slidewire 30.

If the movement of the slidewire 30 is sufficient to rebalance the connections to the potentiometer 14 in accordance with the changed temperature at the thermocouple 10, the galvanometer 21 will balance, and when its needle 44 is subsequently released, will remain in its mid-position. However, if this first adjustment of the slidewire 30, relative to the stationary connection 31, is not quite sufficient to balance the galvanometer, an additional adjustment will be made during the second cycle of operation when the needle 44 will be deflected through a smaller angle and clamped between the bars 45. In this manner, a suitable adjustment of the slidewire 30 may be made in a series of successively decreasing steps. Simultaneously, the pulley 56 will be moved through an equal angle and will transmit this motion through the cord 57 to the recording stylus or pen 59, so that a continuous record will be made upon the scale chart 37.

In order to readjust the connections to the potentiometer 14 to compensate for variations in the cold junction temperature of the thermocouple 10, there is provided an auxiliary shaft 63 continually driven by the shaft 42 through suitable gearing 64 and having mounted thereon a single-toothed pinion 65. The details of this recalibrating mechanism are shown more clearly in Figs. 5 and 6. The pinion 65 cooperates with a gear 66, the single tooth of the pinion 65 being adapted to advance the gear 66 by one tooth for each revolution. The gear 66 is provided with a single projecting tooth 66a and once each revolution of the gear 66, as the gear 65 engages this enlarged tooth, the gear 66 is moved to the left, as referred to Figs. 5 and 6, moving with it its supporting arm or carriage 67 pivoted from the frame at 68. As this assembly moves about the pivot 68, a rim 69 on the slidewire disk 55 engages a disk 70 carrying the slidewires 17 and 28 of Fig. 1, with which cooperate the stationary contacts 18 and 29, respectively.

As the gear 66 is thus moved, a lever 71, carrying a roller bearing on gear 66, is moved about its pivot 71a and engages a cam 72, which is a part of a switch assembly 23. The switch assembly 23 has contacts corresponding to those of the switch 23 of Fig. 1 and is effective to transfer the circuit connections as illustrated therein and described above in connection with the operation of the manual system of Fig. 1. A suitable biasing spring 73 is effective to restore the several parts to their normal positions when the gear 65 is disengaged from the enlarged tooth 66a. The rotation of the gear 66, as effected through the gearing 64 and the single-toothed pinion 65, is at such a speed relative to the rotation of the shaft 49 containing the main measuring slidewire 30 that a plurality, preferably a large number, of cycles of operation of the measuring apparatus occur between the periodic transfer of the thermocouple and the galvanometer by the switch 23 to the calibrating potentiometer.

In case it is desired to secure an indication of the temperature of the cold junction of the thermocouple 10 and/or a readjustment of the potentiometer 14 to compensate for changes in such temperature, at intermediate points in the above-described cycle, there may be provided a manually-operated push-button 74 attached to a shaft or rod 75 pivoted at 76 to the arm 71 to operate the switch 23 and thus secure the desired transfer of circuit connections, which may be termed semi-automatic control. Further, in case complete manual control is desired, the manual operator 74—75 may be arranged so that, upon further movement, the end of the rod 75 engages a projection 77 on the pivotally-mounted arm or carriage 67 and rotates the disk 70 carrying the slidewire disk 55 in a manner similar to that secured by automatic operation of the apparatus. A knurled knob 76, mounted on the scale disk 36 and on a shaft common to the slidewire disk 70, may be operated manually to adjust the connections 18 and 29 to the slidewires 17 and 28, respectively.

Figure 5:
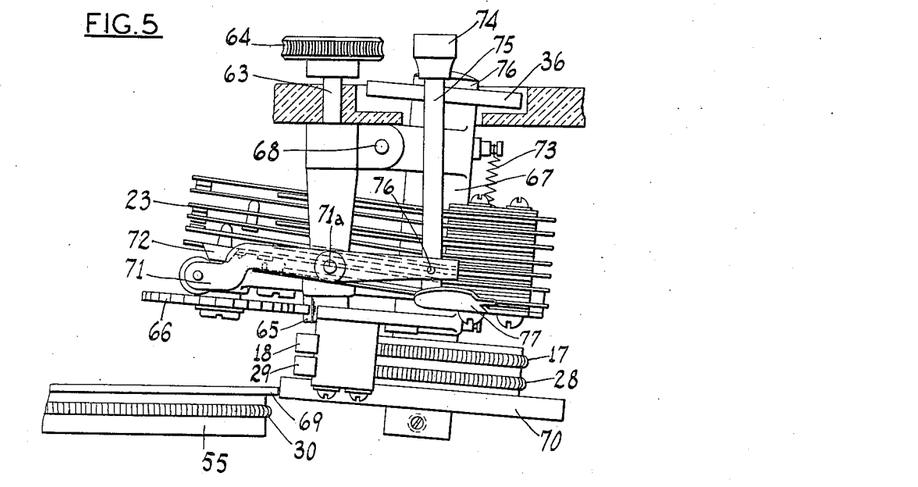
Figs. 5 and 6 are, respectively, on enlarged scale, top plan and rear elevation views of the cold junction compensating mechanism of the apparatus shown in Fig. 4.
Figure 6:
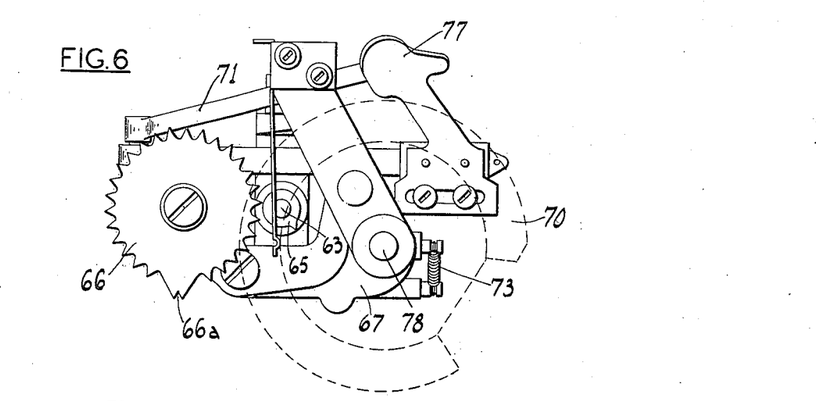
Figure 7:
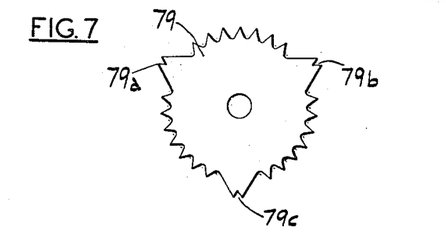
Fig. 7 is a modified form of gear wheel suitable for use in the mechanism of Figs. 5 and 6.

In case it is desired to secure a periodic adjustment of the potentiometers for cold junction compensation more frequent than that provided by the gear 66 of Figs. 5 and 6, there may be substituted therefor a gear 79, shown in Fig.

7, provided with a plurality of symmetrically-spaced, enlarged teeth, in this case, the three teeth 79a, 79b and 79c.

While I have described what I at present consider the preferred embodiments of my invention, it will be obvious to those skilled in the art that various changes and modifications may be made without departing from my invention, and I, therefore, aim in the appended claims, to cover all such changes and modifications as fall within the true spirit and scope of my invention.

What I claim is:

1. A temperature-responsive system comprising a thermocouple provided with a cold junction and with a hot junction subjected to a temperature from which a response is desired, potentiometer means, a circuit including an indicating device and said thermocouple and adjustably connected at each end to said potentiometer means, a circuit including an indicating device and means responsive to the cold junction temperature of said thermocouple, means for balancing the indicating device in said second-named circuit and simultaneously adjusting one of the connections of said first-named circuit to said potentiometer means, and means for adjusting the other connection of said first-named circuit to said potentiometer to balance the indicating device therein, said last-mentioned means including temperature indicating means.

2. A temperature-responsive system comprising a thermocouple provided with a cold junction and with a hot junction subjected to a temperature from which a response is desired, potentiometer means, a circuit including an indicating device and said thermocouple and adjustably connected at each end to said potentiometer means, a second potentiometer means, a circuit including an indicating device and means responsive to the cold junction temperature of said thermocouple and adjustably connected to said second potentiometer means, means for simultaneously adjusting a connection of each of said circuits to their respective potentiometer means to compensate for the effects of said cold junction temperature as evidenced by the balancing of the indicating device in said second-named circuit, and means for adjusting the other connection of said first-named circuit to its said potentiometer means to balance the indicating device therein, said last-mentioned means including temperature indicating means.

3. A temperature-responsive system comprising a thermocouple provided with a cold junction and with a hot junction subjected to a temperature from which a response is desired, potentiometer means, an indicating device, a circuit including said potentiometer means and means responsive to the cold junction temperature of said thermocouple, a second potentiometer means, a circuit including said second potentiometer means and said thermocouple, means for selectively connecting said indicating device in said two circuits, means for simultaneously adjusting a point of connection of each of said circuits to its potentiometer means to balance said indicating device when connected in said first-named circuit, other means for adjusting a second point of connection of said second-named circuit to said second potentiometer means to balance said indicating device when connected in said second-named circuit, said last-mentioned means including a movable member, the movement of which is a measure of the temperature at said thermocouple device.

4. A temperature-responsive system comprising a main thermocouple provided with a cold junction and with a hot junction subjected to a temperature from which a response is desired, an auxiliary thermocouple subjected to the cold-junction temperature of said main thermocouple, a pair of potentiometers, an indicating device, means for selectively connecting said indicating device in circuit with said auxiliary thermocouple and one of said potentiometers or in circuit with the other of said potentiometers and said main thermocouple, means for simultaneously adjusting a point of connection to each of said potentiometers to balance said indicating device when connected in said first-named circuit, and means for adjusting a second point of connection to said other of said potentiometers only to balance said indicating device when connected in said second-named circuit, said last-mentioned means including a movable member, the movement of which is a measure of the hot junction temperature at said main thermocouple.

5. A temperature-responsive system comprising a main high-temperature thermocouple provided with a cold junction and a hot junction subjected to a temperature from which a response is desired, a pair of conductors connected to the elements of said high-temperature thermocouple, a base metal conductor connected to the cold junction of said thermocouple and comprising an element of an auxiliary thermocouple, a pair of split-circuit potentiometers, one branch of a first one of said potentiometers including a resistance element subjected to the temperature of the cold junction of said auxiliary thermocouple and having a temperature coefficient of resistance effective to compensate for variation of temperature of said cold junction of said auxiliary thermocouple, an indicating device, means for selectively connecting said indicating device in circuit with said auxiliary thermocouple and between adjustable points on the branches of said first potentiometer or in circuit with said main thermocouple and between adjustable points on the branches of the other potentiometer, means for simultaneously adjusting one of the points of connection of said indicating device to each of said potentiometers to balance said indicating device when connected in circuit with said auxiliary thermocouple, said adjustments having relative magnitudes dependent upon the relative calibration characteristics of the main and auxiliary thermocouples, and means for adjusting the other point of connection of said indicating device to said other potentiometer to balance said indicating device when connected in circuit with said main thermocouple, and an indicating device movable with said last-mentioned adjustable connection and affording a measurement of the temperature at said main thermocouple.

6. Temperature-measuring apparatus comprising a thermocouple provided with a cold junction and with a hot junction subjected to a temperature from which a response is desired, potentiometer means, a circuit including an indicating device and said thermocouple and connected at each end to said potentiometer means, means for periodically adjusting one of the points of connection of said circuit to said potentiometer means to balance said indicating device, said last-mentioned means including a movable element the position of which is a measure of said temperature, a circuit including an indicating device and means responsive to the cold junction temperature of said thermocouple, and means for periodically balancing the indicating device in said second-named circuit and for simultaneously adjusting the other point of connection of said first-named circuit to said potentiometer means to compensate for variations in the temperature of said cold junction.

7. Temperature measuring apparatus comprising a thermocouple provided with a cold junction and with a hot junction subjected to a temperature from which a response is desired, potentiometer means, a galvanometer provided with a movable needle, a circuit including said thermocouple and adjustably connected at each end to said potentiometer means, a second potentiometer means, a circuit including an auxiliary thermocouple subjected to the temperature of the cold junction of said thermocouple and adjustably connected at one end to said second potentiometer means, means for selectively connecting said galvanometer in said circuits, means operative when said galvanometer is connected in said first-named circuit for periodically arresting said needle and adjusting one of the connections of said first-named circuit to its potentiometer means in accordance with the deflection of said needle, means operative when said galvanometer is connected in said second-named circuit for periodically arresting said needle, and for adjusting said adjustable connection of said second-named circuit and simultaneously therewith adjusting the other connection of said first-named circuit in accordance with the deflection of said needle, means for periodically operating said selective connecting means, said last-mentioned means being proportioned to connect the galvanometer in said second-named circuit for only a small fraction of each cycle of operation, and an indicating device associated and movable with the first-named adjustable connection of said first-named circuit and effective to give a measurement of the temperature to which said first-named thermocouple is subjected.

8. A temperature-responsive system comprising a balanceable network, a thermocouple included in said network, means adjustable to balance said network, a second balanceable network including means responsive to the cold junction temperature of said thermocouple; and means adjustable to balance said second network and concurrently to shift the point of balance of said first network for any given output voltage of said thermocouple to correct for its cold junction temperature.

9. A temperature-responsive system comprising a thermocouple, means providing a reference voltage, structure adjustable to effect balance between the output voltage of said thermocouple and said reference voltage, a balanceable network including means responsive to the cold junction temperature of said thermocouple, and means adjustable to balance said network and concurrently to change said reference voltage to correct for the cold junction temperature of said thermocouple.

10. A temperature measuring system comprising a balanceable network, a thermocouple included in said network, an impedance adjustable to balance said network, an impedance included in said network adjustable to compensate for the cold junction temperature of said thermocouple, a balanceable network including means responsive to the cold junction temperature of said thermocouple, and an impedance adjustable to rebalance said second-named network mechanically coupled to said second-named impedance of said first-named network.

11. A temperature measuring system comprising a balanceable network, a thermocouple device included in said network, an impedance adjustable to balance said network, an impedance included in said network adjustable to compensate for the cold junction temperature of said thermocouple device, a balanceable network including means responsive to the cold junction temperature of said thermocouple device, an impedance adjustable to rebalance said second-named network mechanically coupled to said second-named impedance of said first-named network, a device normally responsive to unbalance of said first-named network, motive means controlled by said responsive device to effect rebalancing adjustment of said first-named impedance, and means operable to connect said device to said second-named network and substantially concurrently to mechanically couple said motive means to said second and third-named impedances to effect compensating adjustment of said second-named impedance and rebalancing adjustment of said third-named impedance.

12. A temperature-responsive system comprising a balanceable network, a thermocouple included in said network, means adjustable to balance said network, a second balanceable network including means responsive to the cold junction temperature of said thermocouple, indicating means for at least one of said networks, and means adjustable to balance said second network and concurrently to shift the point of balance of said first network for any given output voltage of said thermocouple to correct for its cold junction temperature.

13. A temperature measuring system comprising a balanceable network, a thermocouple included in said network, an impedance adjustable to balance said network, an impedance included in said network and adjustable to compensate for the cold junction temperature of said thermocouple, a balanceable network unbalanced by variation in temperature of the cold junction of said thermocouple, means for indicating the extent of unbalance of said networks, an impedance adjustable to rebalance said second named network, and means for simultaneously adjusting said last-named impedance and said second-named impedance to balance said second-named network and to compensate in said first-named network for the effect of said variation of temperature of said cold junction.

14. A temperature-responsive system comprising a balanceable network, a main thermocouple having a given temperature-voltage characteristic included in said network, means adjustable to balance said network, a second balanceable network including an auxiliary thermocouple responsive to the cold junction temperature of said main thermocouple, said auxiliary thermocouple having a different temperature-voltage characteristic, indicating means for said networks, and means adjustable to balance said second network and concurrently to shift the point of balance of said first network an amount to compensate for the effect of said cold junction temperature on the output voltage of said main thermocouple.

15. A temperature-responsive system comprising a main thermocouple provided with a cold junction and with a hot junction subjected to a temperature from which a response is desired, a balanceable network including said thermocouple, an auxiliary thermocouple subjected to the cold junction temperature of said main thermocouple, a second balanceable network including said auxiliary thermocouple, adjusting means individual to said networks, and means for operating one adjusting means to balance said second network and concurrently to operate said other adjusting means to shift the point of balance of said first network an amount to correct for variation of said cold junction temperature of said main thermocouple from its calibration temperature, and means adjustable to balance said first network, the position of said last-named adjustable means representing the temperature to which the hot junction of said main thermocouple is subjected.

16. A temperature-responsive system comprising a balanceable network, a main thermocouple having a given temperature-voltage characteristic included in said network, means adjustable to balance said network, an auxiliary thermocouple subjected to the temperature of the cold junction of said main thermocouple, and means for rendering effective in said network a voltage of magnitude to compensate for the effect of variation in temperature of said cold junction of said main thermocouple, comprising an impedance adjustable in magnitude in accordance with the magnitude of the voltage of said auxiliary thermocouple.

17. A temperature-responsive system comprising a balanceable network, a main thermocouple having a given temperature-voltage characteristic included in said network, means adjustable to balance said network, an auxiliary thermocouple subjected to the temperature of the cold junction of said main thermocouple, an impedance adjustable in accordance with the electromotive force produced by said auxiliary thermocouple, and means adjustable concurrently with adjustment of said impedance for rendering effective in said network a voltage of a magnitude to compensate for the effect of variation in the temperature of said cold junction of said main thermocouple.

18. A temperature-responsive system comprising a balanceable network, a high-temperature thermocouple, means adjustable to balance said network, a base metal thermocouple responsive to the temperature of the cold junction of said high-temperature thermocouple, an impedance device adjustable in accordance with variation in voltage of said base metal thermocouple, and means concurrently adjustable with said impedance device for rendering effective in said network a voltage of magnitude to compensate for the effect of variation in the temperature of said cold junction.

19. A temperature-responsive system comprising a balanceable network, a thermocouple included in said network and comprising elements at least one of which consists of material of character prohibiting its use for lead purposes, a lead of material different from the material of said last-named element connected thereto and comprised in a connection from said last-named element to said network, a lead connecting the other element of said thermocouple to said network, an auxiliary thermocouple subjected to the temperature of the cold junction of said first-named thermocouple, and means adjustable in accordance with the variation of the voltage of said auxiliary thermocouple for rendering effective in said network a voltage of magnitude to compensate for the effect of variation in temperature of said cold junction.

20. A temperature-responsive system comprising a balanceable network, a thermocouple included in said network and comprising elements at least one of which consists of material of character prohibiting its use for lead purposes, a lead of material different from the material of said last-named element connecting it to said network, a lead connecting the other element of said thermocouple to said network, an auxiliary thermocouple comprising an element forming a thermojunction with one of said leads substantially at the cold junction of said first-named thermocouple, and means adjustable in accordance with the voltage produced by said auxiliary thermocouple for rendering effective in said network a voltage of magnitude to compensate for the effect of variation in temperature of said cold junction.

21. A temperature-responsive system comprising a balanceable network, a thermocouple included in said network and having over a given temperature range the characteristic of reversal of polarity of its thermo-electromotive force, said thermocouple having a hot junction subjected to a temperature from which a response is desired, adjustable means for balancing an electromotive force of said network against said thermo-electromotive force, a second balanceable network including means responsive to the cold junction temperature of said thermocouple, indicating means for at least one of said networks, a second means adjustable to balance said second network, a third means for introducing into said first-named network an electromotive force of magnitude to compensate for said characteristic of polarity reversal of said thermocouple, means for concurrently operating said second adjustable means to balance said second network and for operating said third means to compensate in said first-named network for said thermocouple characteristic, and an indicating device, associated and movable with said adjustable means of said first-named network, effective directly to measure the temperature to which said thermocouple is subjected.

MORRIS E. LEEDS.